Nov. 26, 1935.  W. C. TAYLOR  2,022,223
STIRRING MOLTEN GLASS IN CONTINUOUS TANK FURNACES
Filed May 13, 1932  2 Sheets-Sheet 1
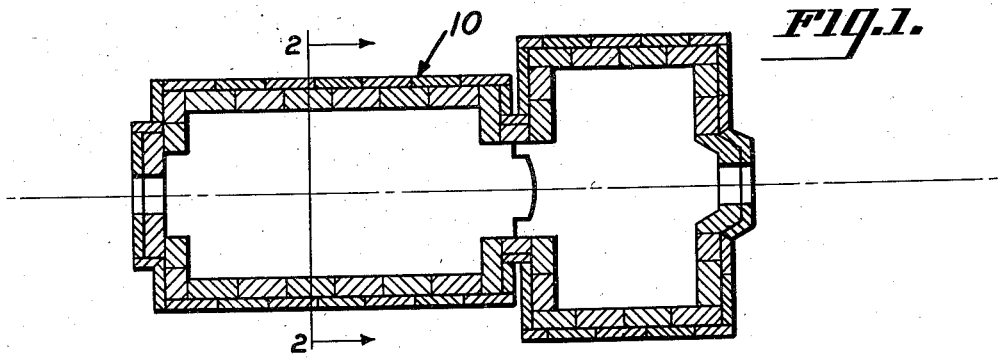
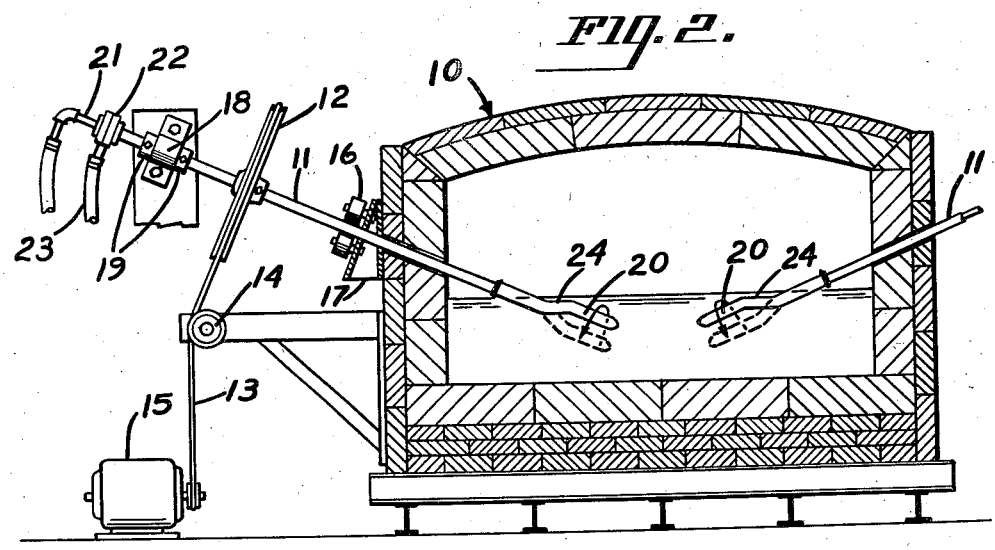
INVENTOR.
WILLIAM C. TAYLOR
BY
ATTORNEYS.

Nov. 26, 1935.   W. C. TAYLOR   2,022,223
STIRRING MOLTEN GLASS IN CONTINUOUS TANK FURNACES
Filed May 13, 1932   2 Sheets-Sheet 2
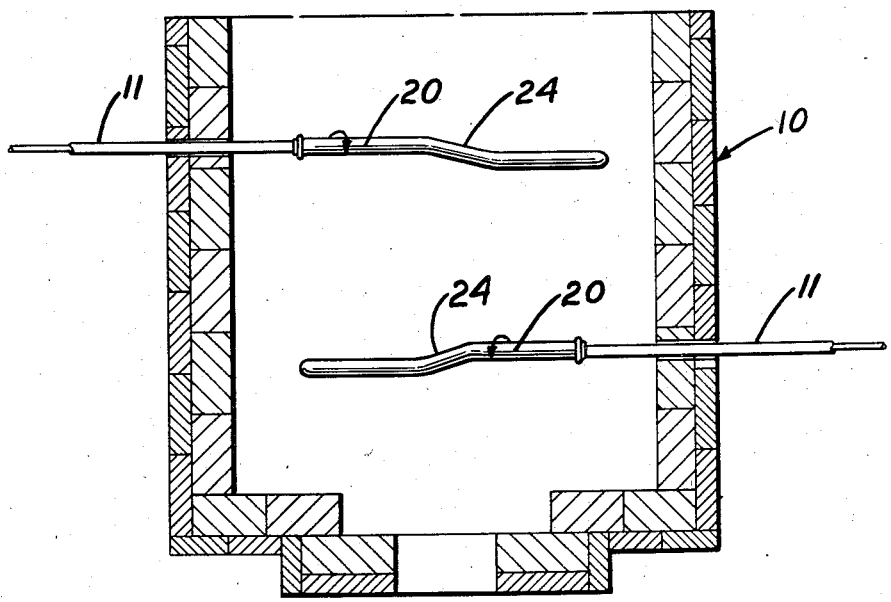
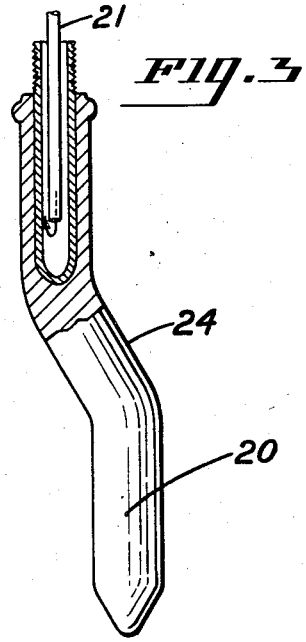
INVENTOR.
WILLIAM C. TAYLOR
BY
ATTORNEYS.

Patented Nov. 26, 1935

2,022,223

UNITED STATES PATENT OFFICE 2,022,223

STIRRING MOLTEN GLASS IN CONTINUOUS TANK FURNACES

William C. Taylor, Corning, N. Y., assignor to Corning Glass Works, Corning, N. Y., a corporation of New York Application May 13, 1932, Serial No. 611,204

3 Claims. (Cl. 49—56)

This invention relates to a device for stirring the molten glass in a continuous tank furnace.

In order to obtain the highest possible degree of homogeneity in glass which is melted in pots and particularly in optical glass it has been customary to stir the molten glass with a clay stirring rod suspended vertically in the glass and rotated about a vertical axis. This method of stirring when applied to a continuous tank furnace possesses no advantage and in fact is detrimental for obtaining homogeneous glass because when such a stirrer is used in the melting end of a tank some of the unmelted or faulty glass is carried by its action toward the delivery end of the tank faster than would be the case if no stirrer were used.

It has been proposed to stir molten glass in continuous tank furnaces by means of a clay stirring rod having a straight reciprocating motion transversely of the tank. It is known that the flow of molten glass from the melting end towards the delivery end of the tank is more rapid at the surface and although this type of stirrer does not tend to sweep faulty glass toward the delivery end of the tank it does not afford sufficient mixing of the non-homogeneous top and bottom layers.

The object of the present invention is to stir molten glass in a continuous tank furnace so as to produce homogeneous glass at the delivery end of the tank.

The above object may be attained by practicing my invention which embodies among its features a stirring rod rotated about a substantially horizontal axis. The stirring rod preferably is offset near the stirring end to enhance the stirring action and the depth of the offset is dependent upon the degree of stirring action desired and upon the angle to which the stirring rod is inclined. The rod is rotated in a direction which is counter to the surface flow of the glass thus carrying back the surface portion of the molten glass and forcing it down to be mixed with the under layers thereof.

My invention further resides in the novel construction, combination and arrangement of parts to be more fully described in the following specification, claimed in the appended claims and illustrated in the accompanying drawings, in which:

Fig. 1 is a plan view of a continuous tank furnace;

Fig. 2 is a vertical section on the line 2—2 of Fig. 1, showing my stirring device in side elevation;

Fig. 3 is a side view partly in section of a clay stirring thimble made in accordance with my invention.

Fig. 4 is a plan view of the melting end of a tank showing a modification of my invention.

In the drawings, a tank designated generally 10 is provided with stirring rods 11 placed in a substantially horizontal position and adapted to be rotated about their longitudinal axes. The driving means are preferably individual units, synchronized or not as desired, attached to each rod but only one is shown in the drawings (Fig. 2). This comprises a pulley 12 driven by a belt 13 passing over an idle pulley 14 to a motor 15. Each stirring rod is supported by a set of four rollers, two of which are shown at 16 and are attached to the side of the tank 10 by a supporting bracket 17. The outer end of the stirring rod 11 is supported by a bearing 18 and the rod is prevented from shifting endwise by two adjustable collars 19. On the end of the stirring rod which is immersed in the molten glass is a clay thimble or stirring finger 20 which is of sufficient length to project somewhat above the level of the glass. Cooling of the rod is accomplished by means of water admitted from a source not shown through an inner tube 21 which extends through the rod 11 to the closed end thereof (Fig. 3), at which point the water emerges from the tube 21 and returns through the rod 11 to a swivel joint 22 where it is carried away by a waste line 23. The clay thimble 20 is preferably provided with a bend or offset 24 located about midway of its length as shown in Figs. 2, 3, and 4.

It will be observed from a contemplation of Fig. 2 that my stirring rod has a retrograde stirring action in that it moves counter to the surface flow of the glass and hence carries the surface glass back down to be mixed with the more stagnant under layers thereof. It thus tends not only to prevent segregation into layers but also to hold the unmelted batch for a longer time near the melting end of the tank and thus produce better homogeneity in the glass when it finally approaches the delivery end of the tank. It will be obvious that the stirring action of my device can be increased or decreased by increasing or decreasing the depth of the bend in the clay thimble or by increasing or decreasing the length of the thimble.

In Fig. 4 I have shown an alternative arrangement of my device wherein the two stirring rods are not placed opposite to each other as in Fig. 2 but are spaced somewhat apart so as to permit the stirring rods to extend across to the respective further sides of the tank. This has the added advantage that the stirring rods can be lowered to a more nearly horizontal position and affords a decided increase in the stirring action with a relatively slight bend in the thimble.

Although in the foregoing there has been shown and described the preferred embodiment of my invention, it is to be understood that minor changes in the details of construction, combination and arrangement of parts may be resorted to without departing from the spirit and scope of the invention as claimed.

What I claim is:

1. The combination with a continuous tank furnace for melting glass, of a stirring rod mounted intermediate the ends of the melting chamber of the furnace for rotation about a substantially horizontal axis and a bent stirring thimble on the end of the rod for contact with the glass.

2. The combination with a continuous tank furnace for melting glass, of stirring rods mounted intermediate the ends of the melting chamber of the tank in opposed relation, said rods being rotatable about substantially horizontal axes and a bent stirring thimble on each of said rods for contact with the glass.

3. The combination with a continuous tank furnace for melting glass, of stirring rods mounted intermediate the ends of the melting chamber of the tank and spaced alternately through the sides thereof, said rods being rotatable about substantially horizontal axes and a bent stirring thimble on each of said rods for contact with the glass.

WILLIAM C. TAYLOR.